(12) United States Patent
Buckley et al.

(10) Patent No.: US 8,428,584 B2
(45) Date of Patent: Apr. 23, 2013

(54) SYSTEM AND METHOD FOR ACCELERATING NETWORK SELECTION BY A WIRELESS USER EQUIPMENT (UE) DEVICE

(75) Inventors: Adrian Buckley, Tracy, CA (US); Andrew Allen, Mundelein, IL (US); Gregory Scott Henderson, Plano, TX (US)

(73) Assignee: Research In Motion Limited, Waterloo (CA)

( * ) Notice: Subject to any disclaimer, the term of this patent is extended or adjusted under 35 U.S.C. 154(b) by 1018 days.

(21) Appl. No.: 11/173,083

(22) Filed: Jul. 1, 2005

(65) Prior Publication Data

US 2007/0004405 A1 Jan. 4, 2007

(51) Int. Cl.
*H04W 4/00* (2009.01)

(52) U.S. Cl.
USPC ..... 455/434; 455/428; 455/432.1; 455/435.2; 455/439; 455/436; 370/328; 370/329; 370/331

(58) Field of Classification Search ........... 709/220, 709/222, 227–229; 455/435.3, 552.1; 370/228
See application file for complete search history.

(56) References Cited

U.S. PATENT DOCUMENTS

| | | | |
|---|---|---|---|
| 5,896,572 A | 4/1999 | Scotton | |
| 5,950,130 A | 9/1999 | Coursey | |
| 5,974,328 A | 10/1999 | Lee et al. | |
| 5,983,115 A | 11/1999 | Mizikovsky | |
| 6,223,042 B1 | 4/2001 | Raffel | |
| 6,324,400 B1 | 11/2001 | Shah et al. | |
| 6,542,716 B1 | 4/2003 | Dent et al. | |
| 6,564,055 B1 | 5/2003 | Hronek | |
| 7,171,216 B1 | 1/2007 | Choksi et al. | |
| 2001/0006892 A1 | 7/2001 | Barnett et al. | |
| 2002/0059453 A1 | 5/2002 | Eriksson et al. | |
| 2002/0082044 A1 | 6/2002 | Davenport | |
| 2002/0168976 A1* | 11/2002 | Krishnan | 455/432 |
| 2003/0003922 A1 | 1/2003 | McClure | |
| 2003/0118015 A1 | 6/2003 | Gunnarsson et al. | |

(Continued)

FOREIGN PATENT DOCUMENTS

| CA | 2504497 | 5/2004 |
|---|---|---|
| EP | 0781064 | 6/1997 |

(Continued)

OTHER PUBLICATIONS

European Search Report; European Patent Office; Jan. 31, 2006; 5 pages.

(Continued)

*Primary Examiner* — Dai A Phuong
(74) *Attorney, Agent, or Firm* — The Danamraj Law Group, P.C.

(57) ABSTRACT

A system and method for accelerating network selection by a wireless user equipment (UE) device without having to perform a full band scan (FBS). In one exemplary embodiment, the wireless UE device is operable to scan in a network environment for discovering at least one network. Depending upon geographic region information decoded from the discovered network's identity information, a logic structure in the wireless UE device is operable to determine a subset of appropriate frequency data for selective scanning by said wireless UE device. Using the subset of appropriate frequency data, a selective scanning is performed for locating a network by the wireless UE device.

17 Claims, 15 Drawing Sheets

U.S. PATENT DOCUMENTS

| | | | |
|---|---|---|---|
| 2003/0158922 A1* | 8/2003 | Park | 709/222 |
| 2003/0232595 A1 | 12/2003 | Baker et al. | |
| 2004/0076130 A1* | 4/2004 | Uchida et al. | 370/335 |
| 2004/0087305 A1 | 5/2004 | Jiang et al. | |
| 2004/0093398 A1* | 5/2004 | Tang et al. | 709/220 |
| 2004/0116132 A1 | 6/2004 | Hunzinger et al. | |
| 2004/0165657 A1 | 8/2004 | Simic et al. | |
| 2004/0192306 A1 | 9/2004 | Elkerat et al. | |
| 2004/0192328 A1 | 9/2004 | Giacalone et al. | |
| 2004/0203893 A1 | 10/2004 | Kotzin | |
| 2004/0233868 A1 | 11/2004 | Farnham | |
| 2004/0248585 A1 | 12/2004 | Karacaoglul | |
| 2004/0249915 A1 | 12/2004 | Russell | |
| 2004/0252656 A1* | 12/2004 | Shiu et al. | 370/328 |
| 2005/0020280 A1 | 1/2005 | Holland et al. | |
| 2005/0055371 A1 | 3/2005 | Sundar et al. | |
| 2005/0063334 A1* | 3/2005 | Fnu et al. | 370/329 |
| 2005/0070279 A1 | 3/2005 | Ginzburg et al. | |
| 2005/0085182 A1 | 4/2005 | Chuberre et al. | |
| 2005/0130591 A1 | 6/2005 | Bouchired et al. | |
| 2005/0130672 A1 | 6/2005 | Dean et al. | |
| 2005/0141464 A1 | 6/2005 | Willey et al. | |
| 2006/0009216 A1 | 1/2006 | Welnick et al. | |
| 2006/0030318 A1 | 2/2006 | Moore et al. | |
| 2006/0068781 A1 | 3/2006 | Lam | |
| 2006/0072507 A1 | 4/2006 | Chandra et al. | |
| 2006/0073827 A1* | 4/2006 | Vaisanen et al. | 455/436 |
| 2006/0171304 A1* | 8/2006 | Hill et al. | 370/228 |
| 2006/0234705 A1* | 10/2006 | Oommen | 455/435.3 |
| 2007/0004405 A1 | 1/2007 | Buckley et al. | |
| 2010/0156706 A1 | 6/2010 | Farmer et al. | |
| 2011/0244887 A1 | 10/2011 | Dupray et al. | |
| 2011/0294531 A1 | 12/2011 | Buckley | |

FOREIGN PATENT DOCUMENTS

| | | | |
|---|---|---|---|
| EP | 0781064 A2 | 6/1997 | |
| EP | 1 460 873 A1 | 9/2004 | |
| EP | 1641292 | 3/2006 | |
| EP | 1703756 A1 | 9/2006 | |
| GB | 2353648 | 2/2001 | |
| JP | 2001235532 | 8/2001 | |
| JP | 2002236165 | 8/2002 | |
| JP | 2002286492 | 10/2002 | |
| JP | 2005143088 | 6/2005 | |
| WO | WO 01/05174 A1 | 1/2001 | |
| WO | 0145446 | 6/2001 | |
| WO | WO 01/62034 A1 | 8/2001 | |
| WO | WO 01/62034 S1 | 8/2001 | |
| WO | 03053086 | 6/2003 | |
| WO | 2004014101 | 2/2004 | |
| WO | 2004073338 | 8/2004 | |
| WO | 2004081600 | 9/2004 | |
| WO | 2004089031 | 10/2004 | |
| WO | 2006007218 A1 | 1/2006 | |
| WO | 2006044024 | 4/2006 | |

OTHER PUBLICATIONS

European Examination Report; European Patent Office; Feb. 22, 2006; 13 pages.
European Search Report; European Patent Office; Aug. 7, 2007; 8 pages.
European Search Report; European Patent Office; Sep. 24, 2007; 7 pages.
European Search Report; European Patent Office; Oct. 2, 2007; 7 pages.
European Search Report; European Patent Office; Oct. 5, 2005; 4 pages.
EPO Search Report in EP Application No. 08172106.0; European Patent Office; Feb. 11, 2009; 11 pages.
Canadian Office Action; Application No. 2,551,238; Canadian Intellectual Property Office; Jun. 12, 2009; 4 pages.
Canadian Office Action; Application No. 2,551,241; Canadian Intellectual Property Office; Nov. 23, 2009; 4 pages.
Canadian Office Action; Application No. 2,589,961; Canadian IPO; Jul. 6, 2010; 6 pgs.
Chinese Office Action; Application No. 200610110892.6; State IPO of People's Republic of China; Jul. 12, 2010; 4 pgs.
Chinese Office Action; Application No. 200610110892.6; State IPO of People's Republic of China; Sep. 10, 2010; 6 pgs.
Canadian Office Action; Application No. 2,589,948; Canadian IPO; Jul. 12, 2010; 2 pgs.
Taiwan Office Action; Application No. 095124095; IPO Taiwan; Jan. 22, 2010; 7 pages.
Taiwan Office Action; Application No. 095124093; IPO Taiwan; Jan. 22, 2010; 7 pages.
EPO Communication; Application No. 07108490.9; European Patent Office; Feb. 16, 2010; 5 pages.
Examiner's First Report, Application No. 2006202765, IP Australia, dated Apr. 19, 2010, 2 pgs.
EPO Communication, Application No. 07111440.9, European Patent Office, dated Apr. 13, 2010, 6 pgs.
IP India, Examination Report, Application No. 1538/del/2006, Dec. 15, 2011, 1 pg.
USPTO, Advisory Action, U.S. Appl. No. 11/712,536, Jan. 3, 2012, 3 pgs.
CIPO, Office Action, Application No. 2,589,961, Jul. 19, 2011, 4 pgs.
TIPO, Decision of IPO, Application No. 095124093, Oct. 27, 2010, 3 pgs.
TIPO, Office Action, Application No. 095124095, May 30, 2011, 6 pgs.
USPTO, Office Action, U.S. Appl. No. 11/173,040, Jun. 23, 2011, 13 pgs.
CIPO, Notice of Allowance, Application No. 2,551,241, Mar. 30, 2012, 1 pg.
CIPO, Office Action, Application No. 2,589,961, Mar. 1, 2012, 4 pgs.
IP India, Office Action, Application No. 1539/DEL/2006, Mar. 5, 2012, 2 pgs.
USPTO, Office Action, U.S. Appl. No. 13/208,048, Apr. 5, 2012, 41 pgs.
CIPO, Notice of Allowance, Application No. 2551238, Oct. 11, 2011, 1 pg.
USPTO, Office Action, U.S. Appl. No. 11/712,536, Oct. 26, 2011, 21 pgs.
CIPO, Office Action, Application No. 2551238, Jan. 25, 2011, 2 pgs.
CIPO, Office Action, Application No. 2551241, Mar. 9, 2011, 2 pgs.
CIPO, Office Action, 2589948, Oct. 7, 2009, 3 pgs.
EPO, Search Report, Application No. 0524146.3, Nov. 21, 2005, 5 pgs.
EPO, Extended Search Report, Application No. 05254146.3, Feb. 21, 2006, 10 pgs.
EPO, Communication pursuant to Article 94(3) EPC, Application No. 05254146.3, Jun. 16, 2009, 3 pgs.
EPO, Decision to Grant, Application No. 05254147.1, Feb. 14, 2008, 1 pg.
EPO, Extended Search Report, Application No. 06126929.6, Mar. 8, 2007, 4 pgs.
EPO, Communication pursuant to Article 94(3) EPC, Application No. 06126929.6, Oct. 25, 2007, 1 pg.
EPO, Extended Search Report, Application No. 07103266.8, Jul. 19, 2007, 8 pgs.
EPO, Communication pursuant to Article 94(3) EPC, Application No. 7103266.8, Jul. 31, 2008, 4 pgs.
EPO, Extended Search Report, Application No. 07108490.9, Nov. 2, 2007, 10 pgs.
EPO, Communication pursuant to Article 94(3) EPC, Application No. 07108490.9, Mar. 20, 2008, 1 pg.
EPO, Communication pursuant to Article 94(3) EPC, Application No. 07108490.9, Feb. 16, 2010, 5 pgs.
EPO, Communication pursuant to Article 94(3) EPC, Application No. 07111440.9, Dec. 19, 2007, 3 pgs.
EPO, Communication pursuant to Article 94(3) EPC, Application No. 07111440.9, Nov. 12, 2008, 6 pgs.
EPO, Communication pursuant to Article 94(3) EPC, Application No. 07111440.9, Apr. 13, 2010, 6 pgs.
EPO, Decision to Grant, Application No. 07111440.9, Feb. 3, 2011, 1 pg.
EPO, Communication pursuant to Article 94(3) EPC, Application No. 07111443.3, Jan. 31, 2008, 1 pg.

EPO, Communication pursuant to Article 94(3) EPC, Application No. 07111443.3, Sep. 29, 2008, 3 pgs.
EPO, Communication pursuant to Article 94(3) EPC, Application No. 07111447.4, Jan. 31, 2008, 1 pg.
EPO, Communication pursuant to Article 94(3) EPC, Application No. 07111447.4, Nov. 5, 2008, 6 pgs.
EPO, Decision to Grant, Application No. 07111447.4, Oct. 1, 2009, 1 pg.
EPO, Search Report, Application No. 08172106.0, Feb. 11, 2009, 11 pgs.
EPO, Communication pursuant to Article 94(3) EPC, Application No. 08172106.0, Oct. 7, 2009, 1 pg.
IP Australia, Examiner's First Report, Application No. 2006202765, Nov. 1, 2010, 2 pgs.
IP Australia, Notice of Acceptance, Application No. 2006202765, May 11, 2011, 3 pgs.
IP Australia, Request for Examination, Application No. 2005202767, Jul. 7, 2009, 1 pg.
IP Australia, Notice of Acceptance, Application No. 2005202767, Jul. 5, 2010, 3 pgs.
SIPO, First Office Action, Application No. 200610110892.6, Jan. 15, 2010, 4 pgs.
SIPO, Rejection Decision, Application No. 200610110892.6, Jan. 26, 2011, 8 pgs.
SIPO, First Office Action, Application No. 200610143754.8, Jan. 8, 2010, 8 pgs.
USPTO, Office Action, U.S. Appl. No. 11/712,536, Mar. 9, 2010, 16 pgs.
USPTO, Office Action, U.S. Appl. No. 11/712,536, Aug. 16, 2010, 18 pgs.
USPTO, Office Action, U.S. Appl. No. 11/712,536, Apr. 4, 2011, 18 pgs.
USPTO, Office Action, U.S. Appl. No. 11/173,040, Sep. 26, 2007, 17 pgs.
USPTO, Office Action, U.S. Appl. No. 11/173,040, Apr. 1, 2008, 12 pgs.
USPTO, Office Action, U.S. Appl. No. 11/173,040, Apr. 6, 2009, 10 pgs.
USPTO, Office Action, U.S. Appl. No. 11/173,040, Nov. 16, 2009, 12 pgs.
USPTO, Office Action, U.S. Appl. No. 11/173,040, May 14, 2010, 12 pgs.
USPTO, Office Action, U.S. Appl. No. 11/173,040, Nov. 10, 2010, 14 pgs.
USPTO, Office Action, U.S. Appl. No. 11/750,417, Jan. 5, 2010, 16 pgs.
USPTO, Office Action, U.S. Appl. No. 11/750,417, May 14, 2010, 17 pgs.
USPTO, Advisory Action, U.S. Appl. No. 11/750,417, Sep. 30, 2010, 3 pgs.
CIPO, Office Action, Application No. 2,589,948, Sep. 2, 2011, 4 pgs.
EPO, Communication Pursuant to Article 96(2) EPC, Application No. 05254147.1, Dec. 14, 2006, 7 pgs.
IPOS, Certification of Grant, Application No. 200604466-3, Dec. 31, 2008, 1 pg.
JPO, Notice of Reasons for Objections, Application No. 2006180361, Aug. 18, 2011, 6 pgs.
JPO, Notice of Reasons for Objections, Application No. 2006180363, Aug. 23, 2011, 5 pgs.
SIPO, Notification of Grant of Rights, Application No. 200610143754.8, Nov. 3, 2010, 2 pgs.
USPTO, Notice of Allowance, U.S. Appl. No. 11/750,417, Apr. 15, 2011, 5 pgs.
KIPO, Office Action, Application No. 10-2006-0062202, Sep. 27, 2012, 3 pgs.
USPTO, Office Action, U.S. Appl. No. 13/208,048, Sep. 24, 2012, 22 pgs.
CIPO, Office Action, Application No. 2,589,948, May 15, 2012, 2 pgs.
CIPO, Office Action, Application No. 2,589,961, Nov. 28, 2012, 5 pgs.
EPO, Communication Under Rule 71(3) EPC, Application No. 07103266.8, Dec. 4, 2012, 6 pgs.
KIPO, Office Action, Application No. 10-2006-0062200, Dec. 26, 2012, 6 pgs.
KIPO, Notice of Allowance of Patent, Application No. 10-2006-0062202, Feb. 15, 2013, 3 pgs.
USPTO, Notice of Allowance and Fee(s) Due, U.S. Appl. No. 11/712,536, Dec. 24, 2012, 9 pgs.
USPTO, Notice of Panel Decision from Pre-Appeal Brief Review, U.S. Appl. No. 13/208,048, Jan. 17, 2013, 2 pgs.
USPTO, Interview Summary, U.S. Appl. No. 13/208,048, Feb. 28, 2013, 3 pgs.

* cited by examiner

| RAN 302 | Services supported by RAN 304 | Other RANs supported by selected RAN 306 | Core Networks supported by RAN 308 | Services supported by each CN 310 |
|---|---|---|---|---|
| RAN-1 | HSDPA EDGE | RAN-X RAN-Z RAN-Y . . WLAN-A WLAN-B | CN-1 CN-2 CN-3 . . . | IMS Presence PoC . . . . |
| RAN-2 | EDGE | RAN-Z WLAN-C WLAN-D | CN-4 CN-5 | IMS |
| . . . | . . . | . . . | . . . | . . . |

| Radio Access Technology A e.g. EDGE | | Radio Access Technology B e.g. WLAN | | Radio Access Technology C e.g. UMTS | |
|---|---|---|---|---|---|
| RAN ID 404A | Core Network ID 406A | RAN ID 404B | Core Network ID 406B | RAN ID 404C | Core Network ID 406C |
| IDa | CN-IDo CN-IDx | IDk | CN-IDx | IDc | CN-IDp |
| IDc | CN-IDp | IDa | CN-IDo CN-IDx | | |
| IDh | CN-IDq | IDd | | | |
| IDb | | IDb | | | |

FIG. 4

| Network with direct relationship to Home network (i.e., Visited networks that provide roaming services to Home network) ⎯602 | Access Networks with relationships to Visited networks (RANs having relationships to the Core Visited networks identified) ⎯604 | Status of Network with direct relationship to Home network (e.g., service status flag) ⎯606 | Services supported on Network with direct relationship to Home network ⎯608 |
|---|---|---|---|
| MCNCa.MSNCa | MCCd.MANCb | ON | IMS |
|  | MCCd.MANCc | OFF | GPRS |
|  | ... | ... | ... |
| MCNCa.MSNCb |  |  |  |
| MCNCa.MSNCc |  |  |  |
| MCCb.MANCc | None |  | WLAN IP access |
| MCCd.MANCa |  |  | ... |

*FIG. 6*

| Country/Region 750 | Geographic Region Code 752 |
|---|---|
| North America 754 | 310<br>311<br>312<br>314<br>315<br>316 |
| ABCD 756 | 123<br>124<br>125 |
| EFGH 758 | 510 |
| ⋮ | ⋮ |

*FIG. 7*

| List name | Priority |
|---|---|
| Operator | 1 |
| Preferred | 1 |
| User | 3 |
| Enterprise | 4 |

| Technology | Frequencies, bands and/or channels |
|---|---|
| Technology A | A, B, C |
| Technology B | D, G |
| : | : |
| Technology Z | J, K |

| Technology | Frequencies, bands and/or channels |
|---|---|
| Technology A | A, C |
| Technology B | D, G |
| : | : |
| Technology Z | J, K |

| Technology | Frequencies, bands and/or channels ||
|---|---|---|
| | Automatic | Manual |
| Technology A | B, C | A, B, C |
| Technology B | D | D, G |
| Technology C | J, K | J |
| . . . | . . . | . . . |
| Technology Z | K, L, M | I, L, V, U |

| Decoded network ID information | Frequencies, bands and/or channels |
|---|---|
| SSID1 | C-J |
| MCC1 | A-B, C-D, XXX |
| MCC2.MANC1 | J, I, K |
| . | . |
| . | . |
| . | . |

SYSTEM AND METHOD FOR ACCELERATING NETWORK SELECTION BY A WIRELESS USER EQUIPMENT (UE) DEVICE

REFERENCE TO RELATED APPLICATION(S)

This application discloses subject matter related to the subject matter disclosed in the following commonly owned co-pending U.S. patent application(s): (i) "SYSTEM AND METHOD FOR PROVIDING NETWORK ADVERTISEMENT INFORMATION VIA A NETWORK ADVERTISEMENT BROKER (NAB)," filed Apr. 28, 2005; application Ser. No. 11/116,470, in the name(s) of: Adrian Buckley, Paul Carpenter, Nicholas P. Alfano, and Andrew Allen; (ii) "NETWORK SELECTION SCHEME USING A ROAMING BROKER (RB)," filed Apr. 28, 2005; application Ser. No. 11/116,461, in the name(s) of: Adrian Buckley, Paul Carpenter, Nicholas P. Alfano, and Andrew Allen; (iii) "SYSTEM AND METHOD FOR ACCELERATING NETWORK SELECTION BY A WIRELESS USER EQUIPMENT (UE) DEVICE USING SATELLITE-BASED POSITIONING SYSTEM," filed even date herewith; application Ser. No. 11/173,040, in the name(s) of: Adrian Buckley and G. Scott Henderson; each of which is hereby incorporated by reference in their entirety.

FIELD OF THE DISCLOSURE

The present patent disclosure generally relates to communication networks. More particularly, and not by way of any limitation, the present patent application is directed to a system and method for accelerating network selection by a wireless user equipment (UE) device.

BACKGROUND

When a wireless user equipment (UE) device is first powered up or when it tries to recover from loss of coverage, it is typically required to search for its last registered Public Land Mobile Network (RPLMN) in every supported radio access technology and frequency bands associated therewith before attempting to register on another PLMN. The issue for operators is that when a UE device loses coverage from its home PLMN, it may have to perform a full band scan (FBS) of all supported bands before possibly selecting a National Roaming Partner (NRP). Today, such a full scan already takes a fairly long time in a dense or complex radio environment, which will be further exacerbated when additional frequency bands are introduced and more access technologies are integrated.

In addition, it is important to note that in most scenarios a full band scan can give rise to inefficient utilization of radio resources. Relatedly, the time to perform a full scan may be so long that the radio environment may have changed significantly between the time when the scan was started and the time the UE device decides to select a new PLMN. As a result, by the time the UE decides to select a new network, another high priority network may have appeared again.

BRIEF DESCRIPTION OF THE DRAWINGS

A more complete understanding of the embodiments of the present patent disclosure may be had by reference to the following Detailed Description when taken in conjunction with the accompanying drawings wherein:

FIGS. 3-7 depict various exemplary database structures provided for facilitating accelerated network selection by a wireless UE device in accordance with the teachings of the present patent disclosure;

FIGS. 8A-8E depict additional exemplary database structures that may be utilized by a UE device for facilitating accelerated network selection;

DETAILED DESCRIPTION OF THE DRAWINGS

Figure 1:
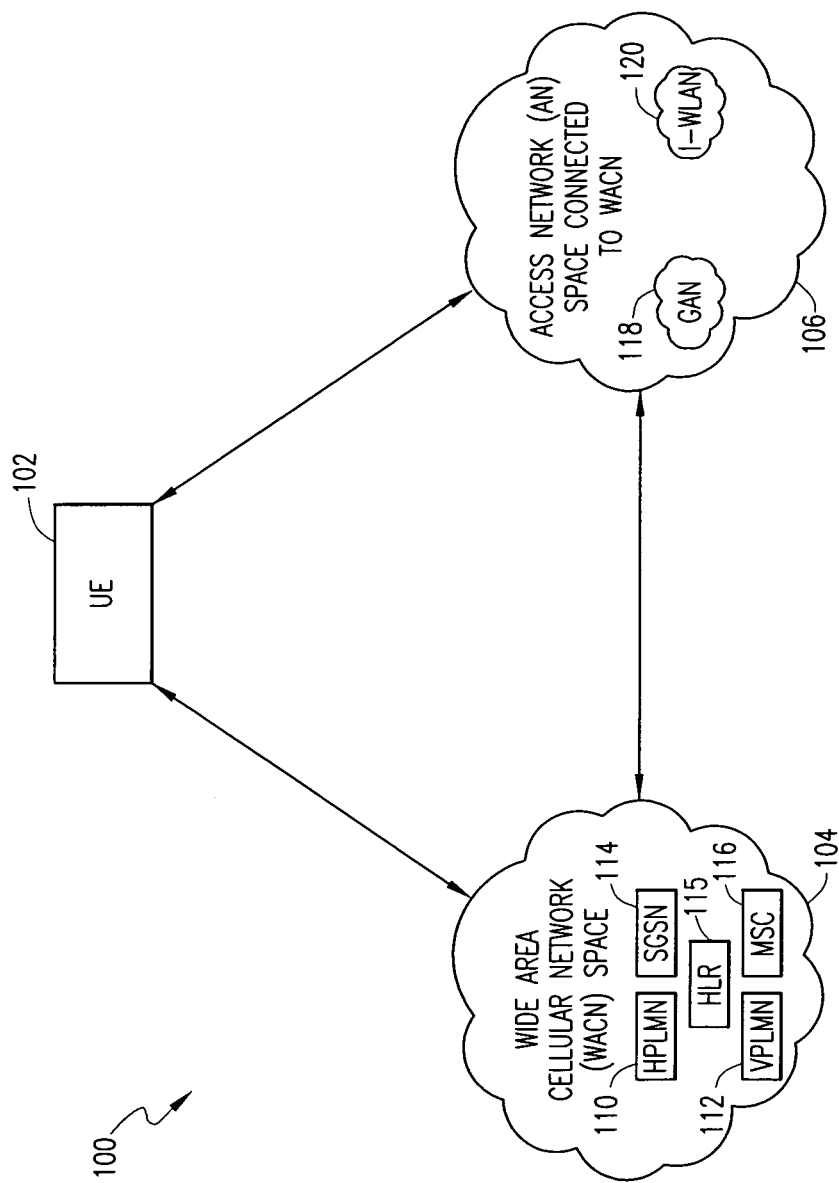
FIG. 1 depicts a generalized network environment wherein an embodiment of the present patent disclosure may be practiced.

In one embodiment, the present disclosure is directed to a method for accelerating network selection by a wireless UE device, comprising: scanning by the wireless UE device for discovering at least one network; decoding the discovered network's identity information; depending on decoded identity information, determining a subset of appropriate frequency data for selective scanning by the wireless UE device; and locating a network via selective scanning by the wireless UE device using the subset of appropriate frequency data.

In another embodiment, the present disclosure is directed to a system for accelerating network selection by a wireless UE device, comprising: means associated with the wireless UE device for discovering at least one network via scanning; means for decoding the discovered network's identity information; means for determining a subset of appropriate frequency data depending on decoded identity information, the subset of appropriate frequency data for facilitating selective scanning by the wireless UE device; and means for locating a network via selective scanning by the wireless UE device using the subset of appropriate frequency data.

In a still further embodiment, the present disclosure is directed to a wireless device, comprising: a logic structure operable to effectuate discovery of at least one network via scanning; a logic structure for decoding the discovered network's identity information; a logic structure for determining a subset of appropriate frequency data depending on decoded identity information, the subset of appropriate frequency data for facilitating selective scanning by the wireless device; and a logic structure for locating a network via selective scanning by the wireless device using the subset of appropriate frequency data. In a related embodiment, where a removable storage module (RSM)-based implementation is provided, the RSM may be provisioned with a database structure that is populated with a plurality of network identifiers wherein each network identifier is associated with a corresponding frequency data item operable to be downloaded to a wireless device. Also, a suitable logic application is included that is operable for downloading to the wireless device a particular frequency data item responsive to receiving a particular network identifier from the wireless device (e.g., decoded from a discovered network's identity information), wherein the particular frequency data item is operable for modulating the wireless device's scanning behavior so that accelerated network selection may be effectuated.

In yet another embodiment, the present disclosure is directed to a scheme and associated structure for accelerating network selection by a wireless UE device, comprising: scanning by the wireless UE device for discovering at least one network; using the discovered network, authenticating by the wireless UE device with a home network node; providing location information by the wireless UE device to the home network node; depending on the location information, determining by the home network node appropriate network list information and associated frequency data; transmitting the appropriate network list information and associated frequency data by the home network node to the wireless UE device; and locating a network via selective scanning by the wireless UE device using at least one of the appropriate network list information and associated frequency data.

In a still further embodiment, the present disclosure is directed to a scheme and associated structure for accelerating network selection by a wireless UE device, comprising: upon powering up the wireless UE device, interrogating an user for location information relative to where the wireless UE device is located; providing appropriate location information to the wireless UE device by the user; and based on the appropriate location information, selecting by the wireless UE device a particular network on a specified frequency for obtaining service. In a related implementation, a system is disclosed for accelerating network selection by a wireless device, comprising: means for pre-loading location information relative to one or more destinations into the wireless device; means for providing network list and frequency data to the wireless device upon communication with a home network, wherein the network list and frequency data is identified based on destination location information; and means for selecting a particular network from a subset of the network list and frequency data for obtaining service, wherein the subset is identified upon entering a particular destination.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized network environment 100 wherein one or more embodiments of the present patent disclosure may be practiced. A generalized wireless user equipment (UE) or mobile equipment (ME) device 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands and/or radio access technologies (RATs). For example, UE/ME device 102 may operate in the cellular telephony band frequencies as well as Wireless Local Area Network (WLAN) bands. Further, other bands in which the UE device could operate wirelessly may comprise Wi-Max bands or one or more satellite bands. Accordingly, for purposes of the present patent disclosure, those skilled in the art should recognize that the term "UE device" or "wireless device" may comprise a mobile equipment (ME) device (with or without any removable storage module or RSM such as a Universal Subscriber Identity Module (USIM) card, Removable User Identity Module (RUIM) card, a Subscriber Identity Module (SIM) card, or a compact Flash card, etc.) as well as other portable wireless information appliances, also with or without such RSMs.

By way of illustration, the network environment 100 is envisioned as two broad categories of communication spaces capable of providing service to UE device 102 wherein acquisition of network advertisement information may be accomplished in accordance with the teachings set forth herein. In wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of home networks 110 (i.e., home PLMNs or HPLMNs, or equivalent HPLMNs or EHPLMNs), visited networks (i.e., VPLMNs) 112, each with appropriate infrastructure such as Home Location Register (HLR) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise radio access and core networks selected from the group comprising Enhanced Data Rates for GSM Evolution (EDGE) networks, Integrated Digital Enhanced Networks (IDENs), Code Division Multiple Access (CDMA) networks, Time Division Multiple Access (TDMA) networks, Universal Mobile Telecommunications System (UMTS) networks, or any $3^{rd}$ Generation Partnership Project (3GPP)-compliant network (e.g., 3GPP or 3GPP2), all operating with well known frequency bandwidths and protocols. That is, at least in some embodiments, the term "PLMN" may be deemed to represent various cellular and wireless technologies (e.g., WLAN, WiMax, public safety network implementations, etc.).

Further, UE device 102 is operable to obtain service from an access network (AN) space 106 that is connected to the WACN space 104. In one implementation, the AN space 106 includes one or more generic access networks (GANs) 118 as well as any type of wireless LAN (WLAN) arrangements 120, both of which may be generalized as any wireless AN that is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard (IEEE 802.16 and IEEE 802.16e), OpenAir standard, and the Bluetooth standard (IEEE 802.15).

In one embodiment, interfacing between the WACN and AN spaces may be effectuated in accordance with certain standards. For instance, GAN 118 may be interfaced with one or more PLMNs using the procedures set forth in the 3GPP TR 43.901, 3GPP TS 43.318 and 3GPP TS 44.318 documents as well as related documentation. Likewise, WLAN 120 may be interfaced with at least one PLMN core using the procedures set forth in the 3GPP TS 22.234, 3GPP TS 23.234 and 3GPP TS 24.234 documents as well as related documentation, and may therefore be referred to as an Interworking WLAN (I-WLAN) arrangement.

Based on the foregoing, it should be recognized that the service infrastructure of the network environment 100 may be generalized into three broad segments: one or more radio access networks (RANs) (which can include cellular band technologies as well as WLAN technologies), one or more core networks (CNs), and one or more service networks (SNs). Depending on network ownership arrangements and service-level agreements, each RAN may support one or more CNs, each of which in turn may support one or more SNs. Such combinations of infrastructure equipment across multiple owners are sometimes used to create Mobile Virtual Network Operators (MVNOs). In some embodiments, the teachings of the present patent disclosure are equally applicable to MVNOs as to PLMNs. Since each RAN, CN, or SN may be provided with its own network identifier (ID code), numerous RAN-CN-SN combinations may be available in the network environment 100. As will be seen below, various network lists and associated data (e.g., user- or operator-preferred networks (access or visited), user- or operator-prohibited networks (access or visited), lists of network capabilities, frequency data (bands, channels, frequencies, etc.) associated with the listed networks) may be provisioned in the network environment or as part of an RSM (i.e., a module selected from USIM cards, RUIM cards, SIM cards, or compact Flash cards, etc.) operable with the UE device or in the network, which could be provided to the UE device or stored in a memory integrated within the device in a customized manner for facilitating accelerated network selection so that a time-consuming FBS procedure may be avoided while attempting to locate a network for service in the exemplary network environment.

Figure 2:
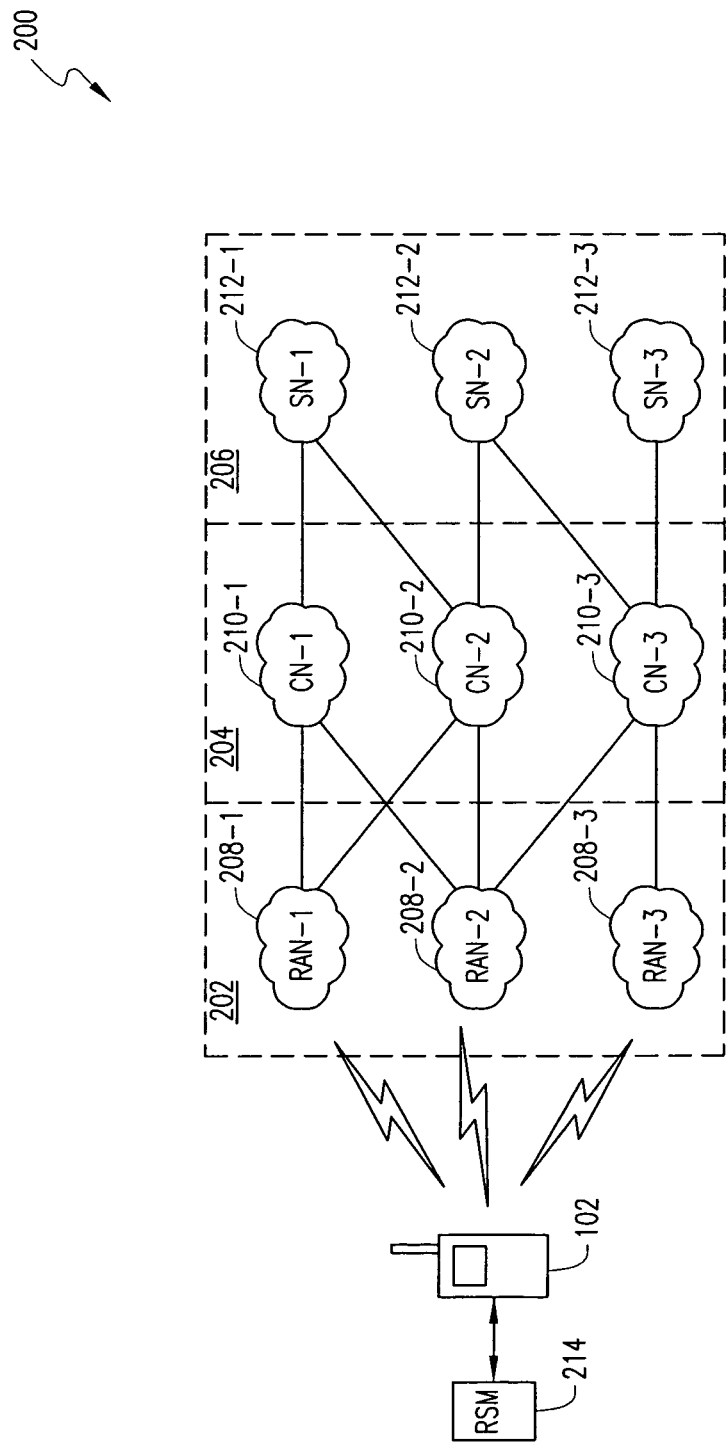
FIG. 2 depicts an exemplary embodiment of a network environment where a wireless user equipment (UE) device is operable to accelerate network selection in accordance with the teachings of the present patent disclosure.

To formalize the teachings of the present disclosure, reference is now taken to FIG. 2 wherein an exemplary embodiment of a network environment 200 is shown that is a more concrete subset of the generalized network environment 100 illustrated in FIG. 1. As depicted, wireless UE/ME device 102 is operably disposed for acquiring network advertisement information via scanning from a RAN segment 202 that is coupled to a CN segment 204 which in turn is coupled to an SN segment 206. Three RANs are illustrative: RAN-1 208-1, RAN-2 208-2 and RAN-3 208-3, which are identified with the network codes MANC1, MANC2 and MANC3, respectively. The CN segment 204 is also illustrated with three CNs: CN-1 210-1 (having an ID code of MCNC1), CN-2 210-2 (having an ID code of MCNC2) and CN-3 210-3 (having an ID code of MCNC3). Likewise, the SN segment 206 is illustrated with SN-1 212-1 (having an ID code of MSNC1), SN-2 212-2 (having an ID code of MSNC2) and SN-3 212-3 (having an ID code of MSNC3).

By way of example, RAN-1 208-1 is operable to support connectivity to two CNs, CN-1 210-1 and CN-2 210-2. In similar fashion, RAN-2 208-2 supports three CNs and RAN-3 208-3 supports only one CN. Each CN supports connectivity to one or more SNs: e.g., CN-3 210-3 connects to SN-2 212-2 as well as SN-3 212-3. Given the interconnectivity of the RAN/CN/SN segments, several combinations of identification codes may be obtained for purposes of uniquely identifying the various RAN-CN-SN combinations that the wireless UE device 102 can potentially discover and select from. For instance, with a suitable Mobile Country Code (MCC) being included, the three ID code combinations associated with RAN-1 208-1 are:

[MCC.MANC1.MCNC1.MSNC1];
[MCC.MANC1.MCNC1.MSNC2]; and
[MCC.MANC1.MCNC2.MSNC2].

Likewise, the ID code combinations associated with RAN-2 208-2 are:

[MCC.MANC2.MCNC1.MSNC1];
[MCC.MANC2.MCNC1.MSNC2];
[MCC.MANC2.MCNC2.MSNC2];
[MCC.MANC2.MCNC3.MSNC2]; and
[MCC.MANC2.MCNC3.MSNC3].

The two ID code combinations associated with RAN-3 208-3 are: [MCC.MANC3.MCNC3.MSNC2] and [MCC.MANC3.MCNC3.MSNC2]. As described in detail in the related U.S. patent application entitled "SYSTEM AND METHOD FOR PROVIDING NETWORK ADVERTISEMENT INFORMATION VIA A NETWORK ADVERTISEMENT BROKER (NAB)," filed Apr. 28, 2005; application Ser. No. 11/116,470, and referenced hereinabove, the UE device can discover applicable network ID code information either in an initial scan procedure (i.e., when the device is not registered on any networks) or in a background scan procedure (i.e. when the device is registered on a network).

Given the diversity of the exemplary network environment 100 described earlier with respect to FIG. 1, it is envisaged that scanning may be effectuated in a frequency band in which at least one of the following technologies is operating: GERAN (without EDGE), GERAN (with EDGE), an IDEN network, a CDMA/CDMA2000/TDMA network, a UMTS network, and so on. Additionally, where WLAN access capability is included, scanning may be effectuated in a frequency band compliant with a WLAN standard selected from: IEEE 802.11b standard, IEEE 802.11a standard, IEEE 802.11g standard, HiperLan standard, HiperLan II standard, Wi-Max standard, OpenAir standard, and Bluetooth standard.

An RSM card 214 is operable to be coupled to UE/ME device 102, wherein a number of network lists and associated frequency data may be provisioned by network operators, etc. When an RSM is present and the UE device is first turned on, the storage module(s) of the UE device may be updated with any information stored in the RSM. Thus, in one embodiment, the RSM could be programmed with the most current frequency information when it is supplied to a subscriber. The data in the RSM may, for example, add extra frequencies to the default list of frequencies, or raster of frequencies, stored in the device for searching or scanning. Alternatively or additionally, the data in the RSM may modify the frequency data items already stored in the device so that those frequencies which are not to be used could be removed, or marked in a way that they are not to be scanned as part of a search strategy. As will be seen below, suitable database structures may be provisioned in the RSM or in the memory of a wireless device for storing applicable frequency data, network list data, among others. Furthermore, additional database structures may be provisioned as well for purposes of accelerating network selection accordance with the teachings of the present disclosure.

Referring now to FIGS. 3-7, depicted therein are various exemplary database structures that may be provided, either individually or in any combination, as part of an RSM, or stored in memory integrated within a UE device, or provisioned at a network node (e.g., a home network node or a broker associated therewith) from which network list information may be selectively downloaded to a UE device in accordance with the teachings of the present patent disclosure. At the outset, it should be appreciated that the various exemplary database structures set forth in the present patent disclosure may typically be implemented as configurable databases where the entries, elements or other contents can be modified via over-the-air (OTA) methods. For example, a network operator can add, delete, or modify any portion of the relevant network list databases. Taking reference to FIG. 3 in particular, reference numeral therein refers to a RAN-based data structure wherein service capabilities, connectivity to other RANs and supported PLMN core networks, et cetera, are provided. Those skilled in the art will recognize that based on the scope of coverage of the database as well as any third-party commercial arrangements, the database structure 300 may be populated with the data entries pertaining to a fairly large number of RANs. Reference numeral 302 refers to one or more RANs identified by their RAN ID codes. Services supported by each RAN are identified in column 304. For example, RAN-1 is operable to support High Speed Datalink Packet Access (HSDPA), EDGE, and the like. Cross-relationship or interoperability of a particular RAN with other access networks is indicated in column 306. As illustrated, RAN-1 interoperates with additional RANs, RAN-X, RAN-Y, and RAN-Z, as well as WLANs, WLAN-A and WLAN-C. Reference numeral 308 refers to the core networks supported by each particular RAN identified in column 302. Reference numeral 310 refers to the various services supported by each CN, such as, e.g., IP Multimedia Subsystem (IMS), Presence, Push-to-Talk over Cellular (PoC), and the like.

FIG. 4 depicts an exemplary database structure 400 that may be provided as an operated-based list, a user-based list or an enterprise-based list, or any combination thereof, that may be downloaded to a UE device for facilitating network selection preferences and prohibitions according to one aspect of the present patent disclosure. In one embodiment, the database structure 400 is configured as an operator-defined network list that specifies a plurality of network IDs which should be considered as preferred networks in one or more radio access technologies, wherein the network IDs are populated by the operator. In another embodiment, the database structure 400 may be configured as one or more user network lists, with one list per user using the wireless UE device, for example. Each such list may be accessed by the users upon identifying themselves to the device, wherein the contents of the list (i.e., network IDs) are populated by the respective users. In yet another embodiment, the database structure 400 may be configured as a list of network IDs that are preferred by an enterprise owning the wireless devices for the benefit of its employee-users.

Irrespective of the particular configuration, the database structure 400 defines a plurality of radio access technologies, e.g., EDGE technology 402A, WLAN technology 402B, and UMTS technology 402C, wherein a number of RAN IDs are provided for each technology. As illustrated in FIG. 4, column 404A identifies multiple RAN IDs for the EDGE technology, each RAN supporting one or more core networks identified in corresponding column 406A. Likewise, columns 404B/406B and columns 404C/406C are provided for the WLAN and UMTS technologies respectively. As one skilled in the art may appreciate, the various IDs can be Service Set IDs (SSIDs) (for WLAN), SIDs (for IS-95 and IS-136), or [MCC, MNC] combinations (for GSM, where MNC identifies a Mobile Network Code).

Similar to the network preference lists set forth above, an analogous database structure may be provided that identifies one or more networks that are forbidden for use. Such a list of prohibited networks may be configured as, for example, an operator-barred RAN list (i.e., specified by an operator), enterprise-barred RAN list (i.e., specified by an enterprise), operator-barred CN list (i.e., specified by an operator), and enterprise-barred CN list (i.e., specified by an enterprise).

In addition to one or more of the embodiments and configurations of the database structures identifying network preferences and prohibitions, one or more home network lists (including equivalent home networks or EHPLMNs) may be provided for facilitating network selection. As is well known, each of the wide area cellular PLMNs may be arranged as a number of cells, with each cell having sectors (e.g., typically three 120-degree sectors per base station (BS) or cell). Each individual cell is provided with an identifier, e.g., CGI parameter in GSM networks, to identify them. Also in GSM, a group of cells is commonly designated as a Location Area (LA) and may be identified by an LA Identifier (LAI). At the macro level, the PLMNs may be identified in accordance with the underlying cellular technology. For example, as alluded to before, GSM-based PLMNs may be identified by an identifier comprised of a combination of MCC and MNC. The CDMA/TDMA-based PLMNs may be identified by a System Identification (SID) parameter and/or a Network Identification (NID) parameter. Regardless of the cellular infrastructure, all cells broadcast the macro level PLMN identifiers such that a wireless device (e.g., UE device 102) wishing to obtain service can identify the wireless network.

Additionally, a subscriber is also given a unique identifier which can vary depending on the underlying cellular infrastructure and may be constructed at least in part from some of the parametrics that are used in constructing the network identifiers. In GSM, for example, the subscriber's IMSI parameter is constructed as [MCC] [MNC] [MIN], where [MCC] identifies the country that the subscriber is from, [MNC] identifies the PLMN network, and [MIN] is the unique ID that identifies the wireless UE device).

Figure 5A:
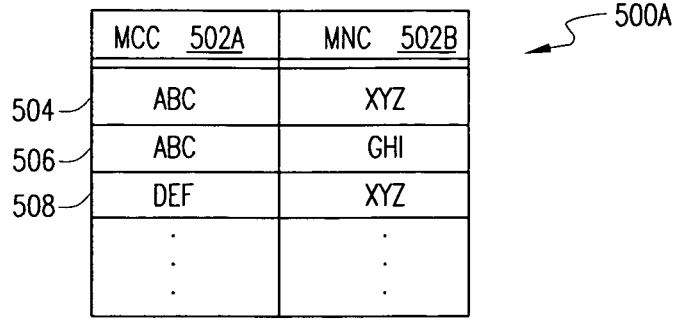
Figure 5B:
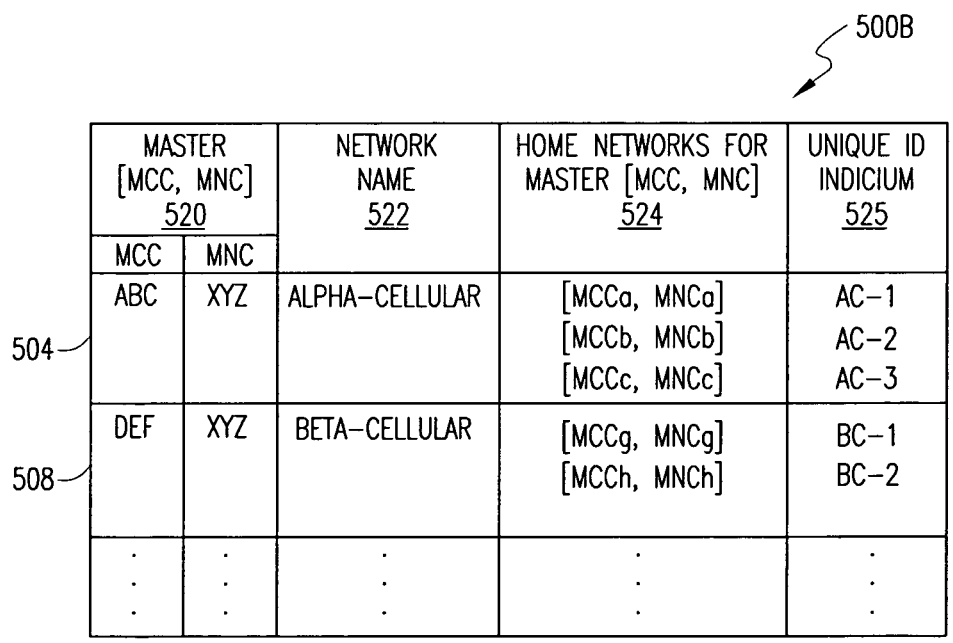

FIGS. 5A and 5B depict exemplary database structures which may be provisioned in an RSM or stored in the UE/ME device for specifying various EHPLMNs in connection with facilitating network selection according to one embodiment. Reference numeral 500A refers to a basic database structure that comprises a list of [MCC] 502A and [MNC] 502B combinations that may be identified as being the same networks. In the case of equivalent networks, the [MCC] [MNC] combinations may identify a set of EHPLMNs for the IMSI associated with the subscriber. Reference numerals 504, 506 and 508 refer to three exemplary networks, wherein networks 504 and 506 share the same [MCC], i.e., [ABC], and networks 504 and 508 share the same [MNC] (i.e., [XYZ]).

Reference numeral 500B refers to an enhanced database structure where additional information may be provided for facilitating network selection. A Master [MCC] [MNC] column 520 identifies the [MCC] and [MNC] combinations that match the IMSI's [MCC]/[MNC] part (i.e., Master Home PLMN). A network name column 522 identifies the master network by name. A home network (E/HPLMN) column 524 includes a list of home networks for each of the Master [MCC] [MNC] pairs. In one implementation, the [MCC] [MNC] combinations identifying the home networks may be provided in a priority order. For example, a positional priority may be implemented wherein an [MCC] [MNC] combination at the top has a higher priority over the one below it, or an [MCC] [MNC] combination to the left has a higher priority over the one to the right. An explicit priority ranking may also be provided wherein an indicator indicating the priority of the PLMN is appended to the database structure 500B. For instance, a value of [0] may indicate the highest priority. Where there is no priority indicator stored, all PLMNs have equal priority. An indicium column 525 is provided for uniquely identifying each PLMN listed in the home network list 524, wherein the indicium may comprise a unique identity name that can include some reference to the Master [MCC] [MNC] pair or the network name associated therewith.

FIG. 6 depicts another exemplary database structure 600 wherein reference numeral 602 refers to a column of networks that have direct visitor relationships to one or more home networks (including equivalent home networks) defined for a wireless UE device and/or subscriber. In other words, the networks identified in column 602 are visited networks that provide roaming services to the home networks. As illustrated, these visited networks may comprise just the access networks (e.g., access networks identified as [MCCb.MANCc] and [MCCd.MANCa]) as well as network combinations that can include CNs and SNs. Column 604 identifies access networks having with relationships with the visited core networks identified in column 602. Column 606 provides status information with respect to indicating whether the identified radio/core network combinations are known to be operational. For instance, a service status flag such as "ON" or "OFF" may be provided to indicate if a particular network combination (e.g., a RAN/CN combination) is in service or not. Additionally, column 608 of the RB database structure provides services and capabilities supported on the visited networks that are identified in column 602.

FIG. 7 depicts an exemplary database structure 700 that may be utilized by a UE device for customizing the network lists and associated frequency data so that only a limited number of networks and/or frequencies need to be selectively scanned by the UE device. Illustratively, data structure 700 includes a mapping relationship between various geographic entities 750 (i.e., individual countries and supra-national geographic regions such as North America, the European Union, et cetera) and geographic region codes 752 associated therewith. In an exemplary arrangement, where a region/country has multiple country codes assigned to it, they are stored in such a way that all of them are associated with or otherwise mapped to the single geographic entity, which typically operates under a common mobile communications regulatory regime. It should be appreciated by one skilled in the art that this arrangement allows the wireless UE device to determine what country it is in when examining the country code of a PLMN it has discovered via scanning. By way of example, there are seven [MCC] values, 310 to 316, assigned to North America 754. Another exemplary entity, a single country ABCD 756, may also be provided with multiple [MCC] values, e.g., from 123, to 125. In another example, a geographic entity EFGH 758 is assigned only one [MCC], e.g., 510. As alluded to before, the data structure 700 may be provided as part of a storage module integrated with the wireless UE device.

Figure 8A:
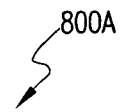
Figure 8B:
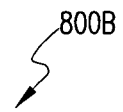

Additionally, the provisioning of various preferred and barred/forbidden network lists may be accompanied with appropriate device logic for specifying the order in which to use them in connection with scanning and network selection. Moreover, each country may have its own regulatory requirements as to which list should take precedence. An enterprise company for instance may forbid access to a public WLAN access point that operates in the vicinity of the company's premises. Additionally, certain device logic may be necessary for specifying the scanning behavior as well, since there may be a number of bands on per-technology basis in which the device is capable of scanning. FIGS. 8A-8E depict additional exemplary database structures or logic for facilitating accelerated network selection in the operation of a wireless UE device. In particular, reference numeral 800A of FIG. 8A refers to a list ordering scheme operable with the device wherein a priority is imposed on the device's various network lists. In FIG. 8B, reference numeral 800B refers to a scheme for specifying initial scan behavior of the device. As illustrated, when the device performs an initial scan, it is provided that Technology A should be scanned in bands A, B, and C. In a GSM implementation, these bands could be selected from, for example, 450 MHz, 700 MHz, 850 MHz, 900 MHz, 1800 MHz, and 1900 MHz. Likewise, Technology B could be CDMA (IS-95) operating in two bands, 850 MHz and 1900 MHz, although additional bands may be added. Although each technology is exemplified with one or more frequency bands in scheme 800B, it should be realized that there may be a technology available with the wireless device in which no scanning bands are specified (e.g., by setting an ON/OFF flag associated with that particular technology or by explicitly not provisioning any band information). Further, the scanning order may be effectuated in serial mode or in parallel mode.

Figure 8C:
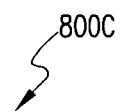

In similar fashion, reference numeral 800C in FIG. 8C refers to a scheme for specifying the device's background scan behavior. As exemplified, when the device performs a background scan, it is provided that Technology A should be scanned in bands A and C. Likewise, Technology B may be scanned in bands D and G. Analogous to the initial scanning process logic, the background scanning scheme 800C may have technologies with no band information provided therefor. As to the background scan interval, it may be configured on the device on a technology-by-technology basis or with a single time parameter for all technologies. In addition, such configuration data may be provided within a fixed memory module of the device or by way of an RSM (e.g., SIM, RUIM, compact Flash, USIM, et cetera), as is the case with respect to the various database structures described elsewhere in the present patent disclosure.

Reference numeral 800D in FIG. 8D depicts a database structure that allows different behavior for manual and automatic network selection. As illustrated, various frequencies, bands and channels (i.e., frequency data items) associated with each technology may be segregated based on whether automatic or manual selection is provisioned. In one implementation, the list of networks in different technologies are presented to the user for selecting. As will be seen in detail hereinbelow, the list of networks may be controlled based on the device's location so that only a small number of appropriate networks may be presented. Upon selecting a particular network by the user, the UE device attempts to register with that network. If registration fails, the same list of networks may be presented to the user, except that the network that failed registration is removed from the new shortlist or otherwise marked with some indication that the network registration was a failure. Additionally, the network list may be presented to the user repeatedly for a number of times, which may be defined by a parameter configured by the operator and stored in the RSM.

Reference numeral 800E in FIG. 8E depicts another database or logic structure which maps information decoded from identity information of networks discovered by a wireless UE device to appropriate frequency data. As illustrated, the decoded network identity information may comprise SSIDS, MCCs, as well as combination codes such as [MCC.MANC] codes. Associated with each code are one or more frequency data items which the wireless UE device may use for selective scanning. As alluded to before, the frequency data may comprise complete bands, sets/ranges of frequencies or channels, etc. Further, the mapping logic may involve fairly complex relationships between the decoded network identity information (including geographic region codes exemplified in the database structure of FIG. 7) and the frequency data. For instance, where no networks have been found in the designated channels or frequencies associated with a particular network code, a "wild card" option may be indicated so that all other frequencies and channels may be scanned for that particular network code.

Those skilled in the art should recognize that similar to the database structure 800E, another database may be provisioned wherein the decoded network ID information is mapped to frequencies, bands and/or channels that are barred from using. As will be seen below, both types of mapping between ID data and frequency data (i.e., positive indications as well as negative indications) may be suitably implemented for purposes of accelerating network selection. Accordingly, where an RSM-based implementation is provided, it may be provisioned with a database structure such as, e.g., the database structure 800E or the like, that is populated with a plurality of network identifiers wherein each network identifier is associated with a corresponding frequency data item operable to be downloaded to a wireless device. Also, a suitable logic application may be provisioned as well that is operable for downloading to the wireless device a particular frequency data item responsive to receiving a particular network identifier from the wireless device, wherein the particular frequency data item for modulating the wireless device's scanning behavior so that accelerated network selection may be effectuated.

Figure 9:
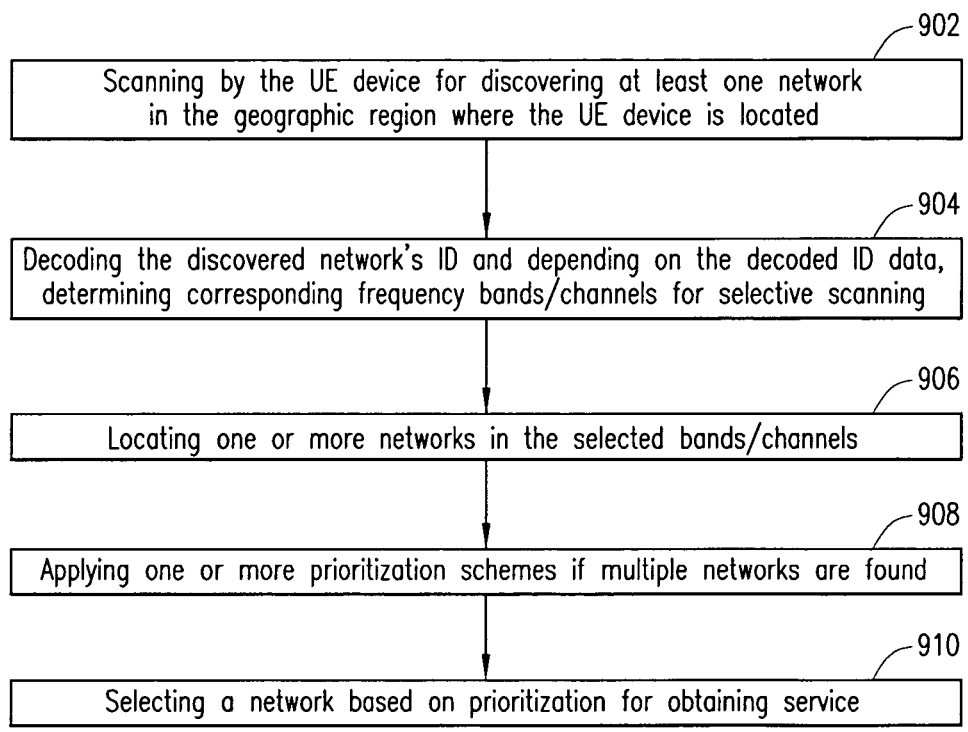
FIG. 9 is a flowchart associated with an embodiment of the present patent disclosure.

FIG. 9 is a flowchart associated with an embodiment of the present patent disclosure for accelerating network selection which may be performed as an initial/background scan or when recovering from loss of coverage from a registered network, or after power-up. Upon scanning by the UE device in one or more frequency ranges and/or in one or more radio access technologies for discovering at least one network in a geographic region where the device is located (block 902), suitable device logic provisioned with the UE device is operable to decode the discovered network's identity information. Thereafter, depending on the decoded network identity information, a subset of appropriate frequency data corresponding thereto is determined, which may also depend on accounting for barred frequencies where provisioned. There processes are set forth in block 904. Using the subset of appropriate frequency data, instead of effectuating a full band scan, the wireless UE device attempts to locate one or more networks in the selected bands and channels (block 906). If multiple networks are discovered, one or more priority schemes may be applied (block 908), whereupon a particular network is selected for obtaining service (block 910).

Figure 10:
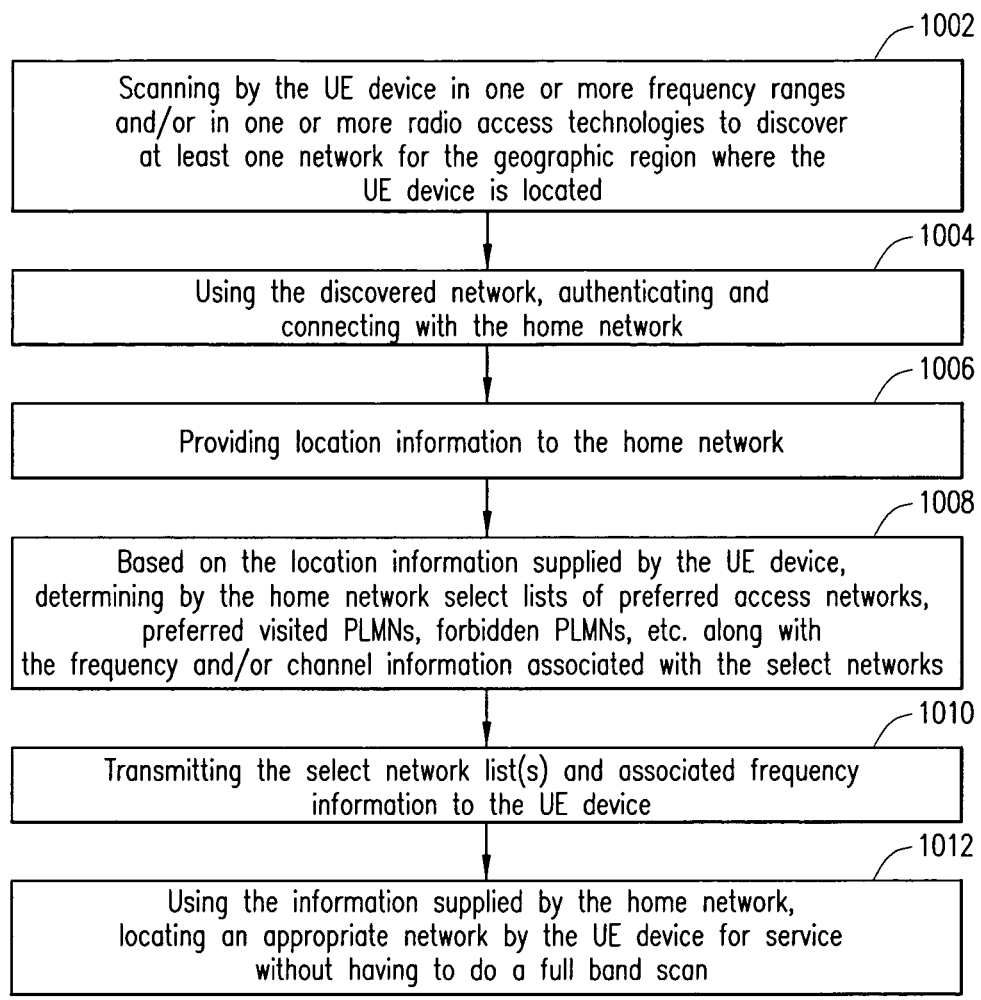
FIG. 10 is a flowchart associated with another embodiment of the present patent disclosure.

FIG. 10 is a flowchart associated with another embodiment of the present patent disclosure for accelerating network selection, wherein a network node (e.g., a home network node or a broker node associated therewith) is involved. As before, the UE device scans in one or more frequency ranges and/or in one or more radio access technologies for discovering at least one network in a geographic region where the device is located (block 1002). Using the discovered network, the wireless UE device authenticates with the home network node or its broker node (block 1004). Details regarding authentication with the home network and associated broker node(s) may be found in the following commonly owned co-pending U.S. patent applications: (i) "NETWORK SELECTION SCHEME USING A ROAMING BROKER (RB)" filed Apr. 28, 2005; application Ser. No. 11/116,461; and (ii) "SYSTEM AND METHOD FOR PROVIDING NETWORK ADVERTISEMENT INFORMATION VIA A NETWORK ADVERTISEMENT BROKER (NAB)" filed Apr. 28, 2005; application Ser. No. 11/116,470; each of which has been referenced hereinabove.

Upon authentication and establishment of connection with the home network, the wireless UE device is operable to provide its location information to the home network node (block 1006). In one arrangement, the location information (e.g., country/region codes) may be determined depending on the discovered network's Cell ID information. Based on the location information supplied by the device, the network node is operable to determine a selection of appropriate network list information (e.g., preferred access networks, preferred VPLMNs, forbidden VPLMNs, etc.) and associated frequency data (block 1008). Thereafter, the network node is operable to transmit the network list information and associated frequency data to the wireless UE device via a number of mechanisms (block 1010); such as, e.g., an Unstructured Supplementary Data Service (USSD) mechanism, a Short Message Service (SMS) mechanism, a Short Message Service over Internet Protocol (SMS over IP) mechanism, an Open Mobile Alliance Device Manager (OMA-DM) mechanism (i.e., SyncML), or a Wireless Application Protocol (WAP) client provisioning mechanism. Using the network list and frequency information supplied by the home network node, the wireless UE device is operable to locate an appropriate network for service without having to do a full scan (block 1012).

In one arrangement, the network lists and associated frequency and/or channel information on which the listed networks operate may be generated and stored in a node that may be continuously updated in real time based on data supplied by the UE device. That is, during the background scans of the UE device, appropriate geographic location information, the networks discovered, the frequencies they are operating on, etc. could be transmitted back to the network node. Again, such transport may be effectuated using mechanisms such as USSD, SMS, SMS over IP, etc.

Figure 11:
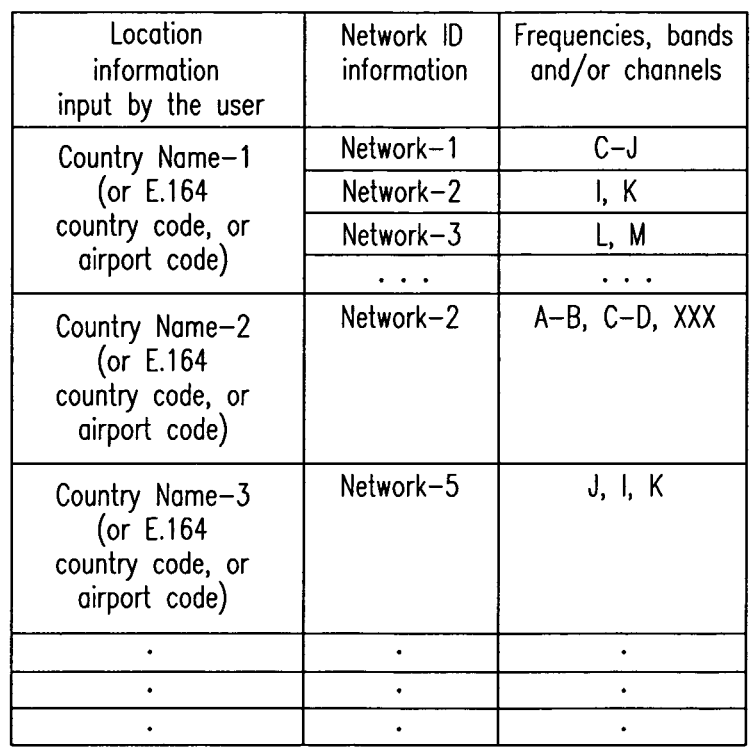
FIG. 11 is another exemplary database structure that may be utilized for facilitating accelerated network selection.
Figure 12A:
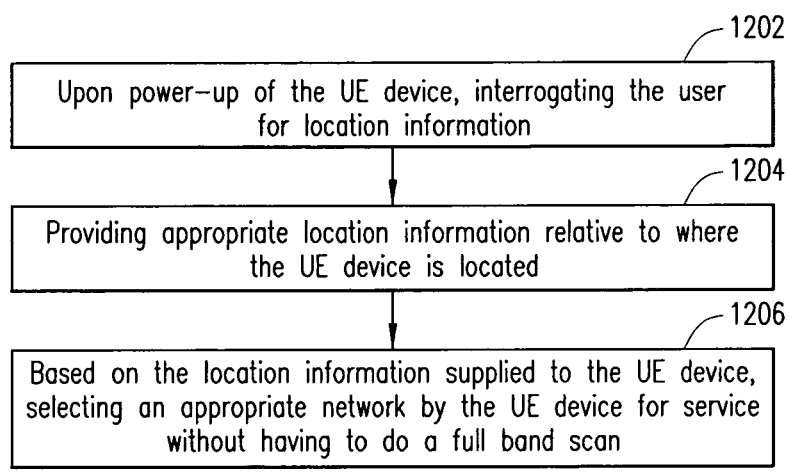
FIGS. 12A and 12B depict flowcharts associated with further embodiments of the present patent disclosure.

FIG. 11 is another exemplary database structure 1100 that may be utilized for facilitating accelerated network selection according to yet another embodiment. As before, the database structure 1100 may be stored within the device memory or provisioned via an RSM. Reference numeral 1102 refers to a column of location information data which could be country names, E.164 country codes, or codes associated with prominent facilities such as airports. Corresponding to the location information data 1102 are provided various network ID data 1104 and associated frequency data 1106. that may be entered or provided by the user. As illustrated in FIG. 12A, upon power-up of the UE device by a user, logic provisioned therewith is operable to interrogate the user for location information relative to where the wireless UE device is located (block 1202). Responsive thereto, the user can provide appropriate location information (e.g., country name, E.164 code, or an airport code) (block 1204). Based on the location supplied to the wireless UE device, the device logic is operable to select an appropriate network on a specified frequency for obtaining service without a full scan (block 1206).

Figure 12B:
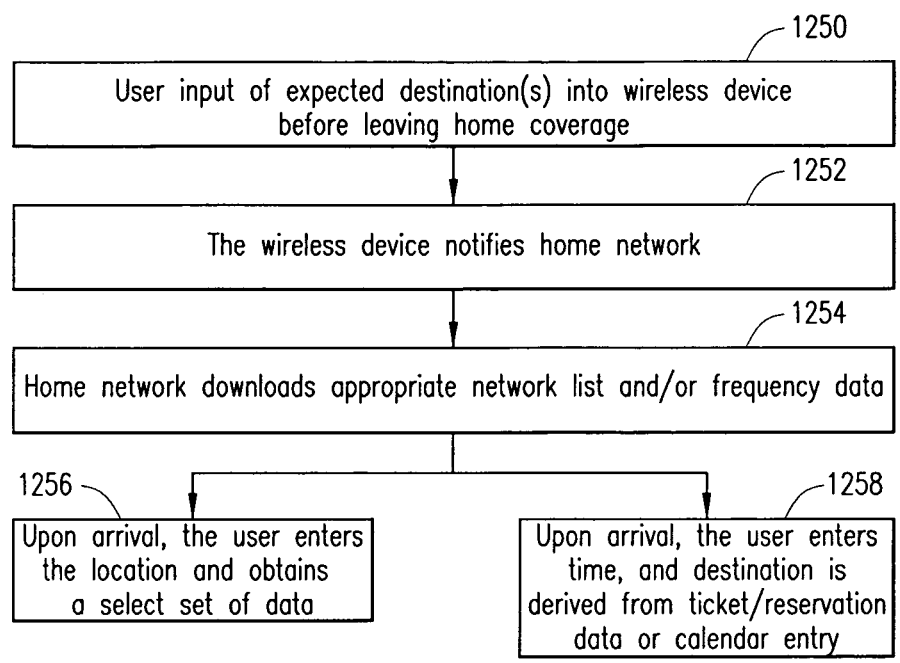

Those skilled in the art should recognize that a host of scenarios could be implemented within the context of the aforementioned scheme where user-provided location information is utilized. For example, in one scenario as depicted in FIG. 12B, the user enters expected destination(s) into the wireless device prior to leaving coverage/connectivity with or to the home network (block 1250). Responsive thereto, upon communication from the wireless device (block 1252), the home network is operable to download a variety of network list and frequency data (e.g., expected technologies, carrier (s), and frequencies, et cetera, any and all of which could be pre-loaded) for each destination (block 1254). Upon arrival at the destination, the user identifies which pre-loaded destination to select. Thereafter, the wireless device uses the identified, pre-loaded list and scans just for those entries (block 1256).

In another exemplary implementation, continuing to refer to FIG. 12B, pre-loaded location information may be integrated with entries from external databases, e.g., entries in airline ticketing/reservation systems, as well as personal information databases, e.g., calendar/planner databases on the device, wherein the use of a "local time" parameter and an "arrival time" parameter may be supported. Accordingly, selection of pre-loaded list/frequency may be automated when powering up upon arrival or returning to coverage. As exemplified in block 1258, the user can enter an appropriate time parameter into the wireless device or the wireless device can receive the time data from the network, whereupon the destination may be derived from the ticket/reservation data or calendar entry.

Figure 13:
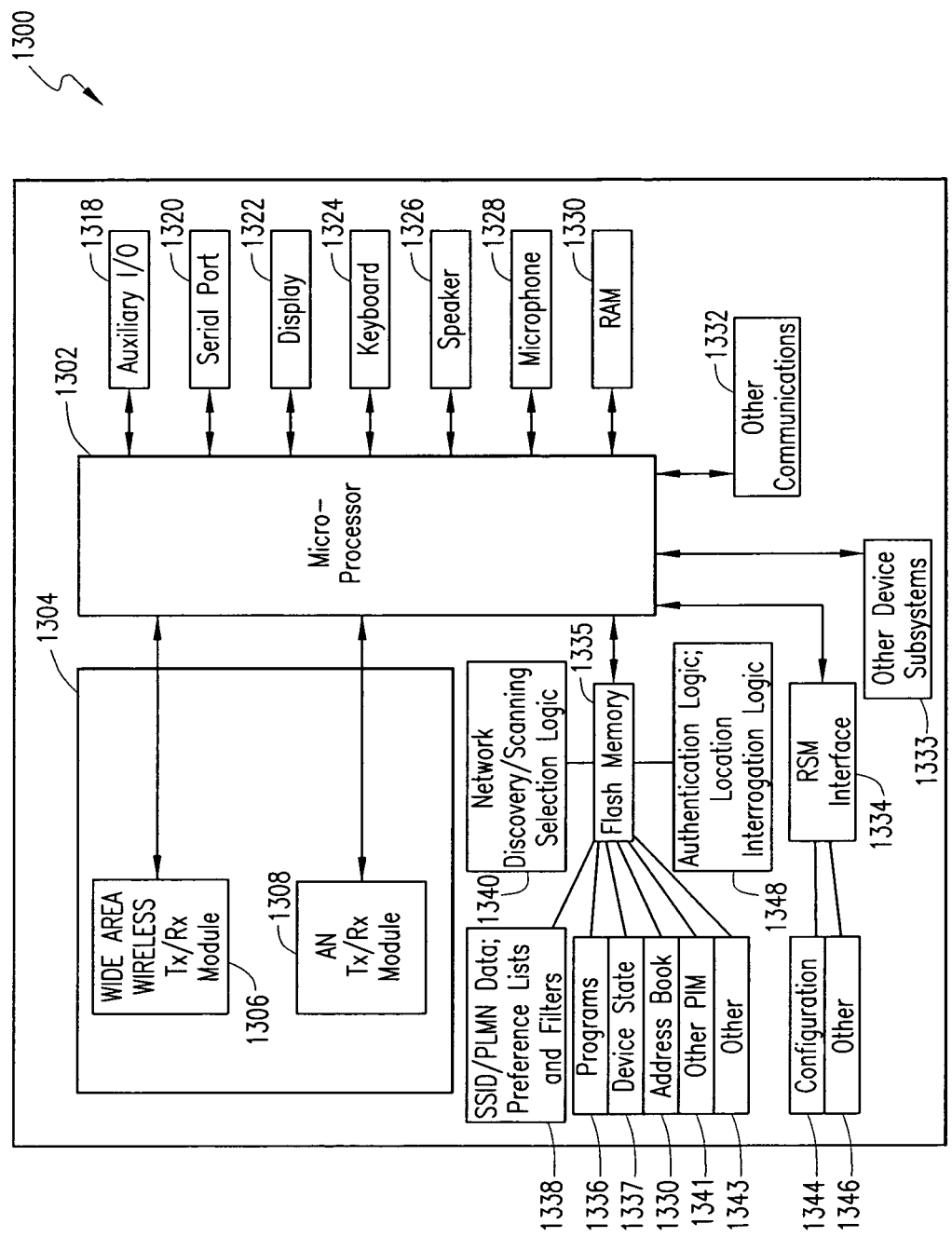
FIG. 13 depicts a block diagram of an embodiment of a wireless UE device operable to accelerate network selection according to the teachings of the present patent disclosure.

FIG. 13 depicts a block diagram of an embodiment of a wireless device or UE/ME device 1300 operable to accelerate network selection according to the teachings of the present patent disclosure. It will be recognized by those skilled in the art upon reference hereto that although an embodiment of UE 102 may comprise an arrangement similar to one shown in FIG. 13, there can be a number of variations and modifications, in hardware, software or firmware, with respect to the various modules depicted. Accordingly, the arrangement of FIG. 13 should be taken as illustrative rather than limiting with respect to the embodiments of the present patent disclosure. A microprocessor 1302 providing for the overall control of UE 1300 is operably coupled to a communication subsystem 1304 which includes transmitter/receiver (transceiver) functionality for effectuating multi-mode scanning and communications over a plurality of bands. By way of example, a wide area wireless Tx/Rx module 1306 and a wireless AN Tx/Rx module 1308 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 1304 may be dependent upon the communications networks with which the UE device is intended to operate. In one embodiment, the communication subsystem 1304 is operable with both voice and data communications.

Microprocessor 1302 also interfaces with further device subsystems such as auxiliary input/output (I/O) 1318, serial port 1320, display 1322, keyboard 1324, speaker 1326, microphone 1328, random access memory (RAM) 1330, a short-range communications subsystem 1332, and any other device subsystems generally labeled as reference numeral 1333. To control access, an RSM (SIM/RUIM/USIM) interface 1334 is also provided in communication with the microprocessor 1302. In one implementation, RSM interface 1334 is operable with an RSM card having a number of key configurations 1344 and other information 1346 such as identification and subscriber-related data as well as one or more SSID/PLMN lists and filters described in detail hereinabove.

Operating system software and other control software may be embodied in a persistent storage module (i.e., non-volatile storage) such as Flash memory 1335. In one implementation, Flash memory 1335 may be segregated into different areas, e.g., storage area for computer programs 1336 as well as data storage regions such as device state 1337, address book 1339, other personal information manager (PIM) data 1341, and other data storage areas generally labeled as reference numeral 1343. Additionally, appropriate network discovery/selection logic 1340 may be provided as part of the persistent storage for executing the various network discovery/scanning and accelerated selection procedures set forth in the preceding sections. Additionally or alternatively, another logic module 1348 is provided for facilitating home network authentication, location interrogation, etc. Associated therewith is a storage module 1338 for storing the SSID/PLMN lists, location-based selection/scanning filters, capability indicators, et cetera, also described in detail hereinabove.

In view of the teachings set forth herein, the various logic blocks of wireless device 1300 should be understood as comprising at least the following: a logic structure operable to effectuate discovery of at least one network via scanning; a logic structure for decoding the at least one network's identity information; a logic structure for determining a subset of appropriate frequency data depending on decoded identity information, the subset of appropriate frequency data for facilitating selective scanning by said wireless device; and a logic structure for locating a network via selective scanning by said wireless device using the subset of appropriate frequency data. In further embodiments, the device logic may also include any of the following: a logic structure for home network authentication; a logic structure for presenting select networks and related data to the user for manual selection; and a logic structure for interrogating the user for manual input of location data.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method for accelerating network selection by a wireless user equipment (UE) device, comprising:
   upon one of power-up and losing coverage of a network with which said wireless UE device was previously registered, scanning by said wireless UE device in at least one band of a plurality of bands identified according to respective radio access technologies as provisioned in a first local database structure;
   upon discovering at least one network via said scanning, decoding said at least one network's identity information, wherein said identity information comprises identification codes corresponding to at least one of a radio access network, a core network and a service network; and
   downloading a second database structure from the network based on said decoded identity information to determine a subset of appropriate frequency data for selective scanning by said wireless UE device, thereby avoiding a full band scan for locating a network.

2. The method for accelerating network selection by a wireless UE device as recited in claim 1, wherein said selective scanning is performed as an initial scan procedure.

3. The method for accelerating network selection by a wireless UE device as recited in claim 1, wherein said selective scanning is further performed as a background scan procedure.

4. The method for accelerating network selection by a wireless UE device as recited in claim 1, wherein said scanning is effectuated in a frequency band compliant with at least one of a Wireless Local Area Network (WLAN) standard selected from: IEEE 802.11 standard, HiperLan standard, HiperLan II standard, Wi-Max standard, OpenAir standard, and Bluetooth standard.

5. The method for accelerating network selection by a wireless UE device as recited in claim 1, wherein said scanning is effectuated in a frequency band compliant with at least one of a General Packet Radio Service (GPRS) network, an Enhanced Data Rates for Global System for Mobile Communications (GSM) Evolution (EDGE) network, a 3rd Generation Partnership Project (3GPP)-compliant network, an Integrated Digital Enhanced Network (IDEN), a Code Division Multiple Access (CDMA) network, a Universal Mobile Telecommunications System (UMTS) network, and a Time Division Multiple Access (TDMA) network.

6. The method for accelerating network selection by a wireless UE device as recited in claim 1, wherein said at least one network's identity information is decoded to generate geographic region information relative to said wireless UE device's location.

7. The method for accelerating network selection by a wireless UE device as recited in claim 1, further comprising: if multiple networks are located by said wireless UE device via selective scanning, applying a prioritization scheme for choosing a particular network for service.

8. The method for accelerating network selection by a wireless UE device as recited in claim 1, further comprising: if multiple networks are located by said wireless UE device via selective scanning, manually choosing a particular network for service.

9. A system for accelerating network selection by a wireless user equipment (UE) device, comprising:
  a component associated with said wireless UE device and configured, upon one of power-up and losing coverage of a network with which said wireless UE device was previously registered, to discover at least one network via scanning in at least one band of a plurality of bands identified according to respective radio access technologies as provisioned in a first local database structure;
  a component configured to decode said at least one network's identity information, wherein said identity information comprises identification codes corresponding to at least one of a radio access network, a core network and a service network; and
  a component configured to download a second database structure from the network based on said decoded identity information to determine a subset of appropriate frequency data for facilitating selective scanning by said wireless UE device, thereby avoiding a full band scan for locating a network.

10. The system for accelerating network selection by a wireless UE device as recited in claim 9, wherein said selective scanning is performed as an initial scan procedure.

11. The system for accelerating network selection by a wireless UE device as recited in claim 9, wherein said selective scanning is further performed as a background scan procedure.

12. The system for accelerating network selection by a wireless UE device as recited in claim 9, wherein said scanning is effectuated in a frequency band compliant with at least one of a Wireless Local Area Network (WLAN) standard selected from: IEEE 802.11 standard, HiperLan standard, HiperLan II standard, Wi-Max standard, OpenAir standard, and Bluetooth standard.

13. The system for accelerating network selection by a wireless UE device as recited in claim 9, wherein said scanning is effectuated in a frequency band compliant with at least one of a General Packet Radio Service (GPRS) network, an Enhanced Data Rates for Global System for Mobile Communications (GSM) Evolution (EDGE) network, a 3rd Generation Partnership Project (3GPP)-compliant network, an Integrated Digital Enhanced Network (IDEM), a Code Division Multiple Access (CDMA) network, a Universal Mobile Telecommunications System (UMTS) network, and a Time Division Multiple Access (TDMA) network.

14. The system for accelerating network selection by a wireless UE device as recited in claim 9, wherein said at least one network's identity information is decoded to generate geographic region information relative to said wireless UE device's location.

15. The system for accelerating network selection by a wireless UE device as recited in claim 9, further comprising: a component configured to apply a prioritization scheme to facilitate selection of a particular network for service if multiple networks are located by said wireless UE device via selective scanning.

16. The system for accelerating network selection by a wireless UE device as recited in claim 9, further comprising: a component configured to manually choose a particular network for service if multiple networks are located by said wireless UE device via selective scanning.

17. A wireless device, comprising:
  a communications subsystem operable for scanning and for communicating over a plurality of bands;
  a logic structure operable, upon one of power-up and losing coverage of a network with which said wireless UE device was previously registered, to effectuate discovery of at least one network via scanning in at least one band of a plurality of bands identified according to respective radio access technologies as provisioned in a first local database structure;
  a logic structure for decoding said at least one network's identity information, wherein said identity information comprises identification codes corresponding to at least one of a radio access network, a core network and a service network; and
  a logic structure for downloading a second database structure from the network based on said decoded identity information to determine a subset of appropriate frequency data depending on decoded identity information, said subset of appropriate frequency data for facilitating selective scanning by said wireless device, thereby avoiding a full band scan for locating a network;
  wherein said logic structures comprise at least one of hardware, firmware, and software that is stored in a memory of the wireless device.

\* \* \* \* \*

UNITED STATES PATENT AND TRADEMARK OFFICE
CERTIFICATE OF CORRECTION

PATENT NO. : 8,428,584 B2  
APPLICATION NO. : 11/173083  
DATED : April 23, 2013  
INVENTOR(S) : Adrian Buckley et al.

It is certified that error appears in the above-identified patent and that said Letters Patent is hereby corrected as shown below:

Column 16, Line 13, "(IDEM)" should read -- (IDEN) --.

Signed and Sealed this  
Ninth Day of July, 2013

Teresa Stanek Rea  
*Acting Director of the United States Patent and Trademark Office*